US 8,179,990 B2
May 15, 2012

(12) United States Patent
Orlik et al.

(10) Patent No.: US 8,179,990 B2
(45) Date of Patent: May 15, 2012

(54) CODING FOR LARGE ANTENNA ARRAYS IN MIMO NETWORKS

(75) Inventors: Philip V. Orlik, Cambridge, MA (US); Wataru Matsumoto, Kanagawa (JP); Andreas F. Molisch, Arlington, MA (US); Zhifeng Tao, Allston, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 910 days.

(21) Appl. No.: 12/212,609

(22) Filed: Sep. 17, 2008

(65) Prior Publication Data

US 2009/0262852 A1 Oct. 22, 2009

Related U.S. Application Data

(60) Provisional application No. 61/021,359, filed on Jan. 16, 2008.

(51) Int. Cl.
*H04B 7/02* (2006.01)
*H04L 1/02* (2006.01)

(52) U.S. Cl. ........................................ 375/267
(58) Field of Classification Search ............ 375/259, 375/260, 261, 262, 267, 286, 295, 340, 343, 375/346, 347; 370/206, 208, 252, 310, 329, 370/342, 349, 487
See application file for complete search history.

(56) References Cited

U.S. PATENT DOCUMENTS

| | | | |
|---|---|---|---|
| 2004/0057530 A1 | 3/2004 | Tarokh et al. | |
| 2006/0153098 A1* | 7/2006 | Shimizu et al. | 370/254 |
| 2007/0115864 A1* | 5/2007 | Bar-Ness et al. | 370/278 |
| 2007/0140370 A1* | 6/2007 | Helard et al. | 375/267 |
| 2007/0155433 A1* | 7/2007 | Ito et al. | 455/562.1 |
| 2008/0304593 A1* | 12/2008 | Khan et al. | 375/267 |

FOREIGN PATENT DOCUMENTS

| | | |
|---|---|---|
| EP | 1986384 | 10/2008 |
| WO | 2003/101029 | 12/2003 |
| WO | 2007/123904 | 11/2007 |

OTHER PUBLICATIONS

Hui Zhao et al.: "An Adaptive HARQ Scheme Based on Quasi-Othogonal Space-Time Coding for D-STTD System" Global Telecommunications Conference, 2007. Globecom '07 IEEE, Piscataway, NJ, USA Nov. 1, 2007, pp. 4000-4004.

* cited by examiner

*Primary Examiner* — David C. Payne
*Assistant Examiner* — Syed Haider
(74) *Attorney, Agent, or Firm* — Dirk Brinkman; Gene Vinokur

(57) ABSTRACT

A method transmits a sequence of symbols in a multiple-input multiple-output (MIMO) network including a transmitter having a set of transmit antennas and a receiver having a set of receive antennas. The sequence of symbols is represented by a vector $S=[S_1\ S_2\ S_3\ S_4]^T$ of individual symbols, where T is a transpose operator. The individual symbols are transmitted as a transmit matrix $$S = \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

where * is a complex conjugate, and wherein each column of the matrix S represents the symbols transmitted at each transmission interval, and subscripts index the set of transmit antennas.

6 Claims, 6 Drawing Sheets

CODING FOR LARGE ANTENNA ARRAYS IN MIMO NETWORKS

RELATED APPLICATION

This Application claims priority to U.S. Provisional Patent Application 61/021,359, "Space time block coding for HARQ and MIMO transmissions)" file by Orlik et al. on Jan. 16, 2008.

FIELD OF THE INVENTION

This invention relates generally to the field of wireless communications, and more particularly to transmitting and receiving data using a large number of transmit and receive antennas in multiple-input multiple-output (MIMO) networks.

BACKGROUND OF THE INVENTION

MIMO Networks

In mobile cellular communication networks, the use of multiple-input multiple-output (MIMO) transmission technology is becoming more widespread. The Worldwide Interoperability for Microwave Access (WiMAX) forum, as well as the 3rd Generation Partnership Project (3GPP) has released standard specifications that make use of MIMO to improve transmission capacity and reliability.

MIMO networks increase capacity by transmitting and receiving symbols using multiple antennas concurrently with a technique usually termed spatial multiplexing (SM). A MIMO receiver can use advanced signal processing and properties of the channel to detect and decode the symbols. To improve reliability, the MIMO network can transmit copies of the symbols from multiple antennas in a technique usually called space time coding (STC). The IEEE 802.16 standard "Part 16: Air interface for Broadband Wireless Access Systems," 802.16, upon which WiMAX is based. WiMAX employs both SM and STC techniques.

In addition to MIMO, the standards specify hybrid automatic repeat requests (HARQ). As in a conventional automatic repeat request (ARQ), a receiver request a retransmission of a message was decoded incorrectly. However, with HARQ, the original corrupted message is retained and combined with the retransmission message to improve the probability of successfully decoding the message and recovering the symbols.

Another problem in MIMO networks is self-interference due to transmitting and receiving with multiple antennas. Self-interference increases as the number of antennas increase. It is also desired to eliminate self interference.

SUMMARY OF THE INVENTION

The embodiments of the invention provides a method for combining hybrid automatic repeat requests (HARQ) with space time coding (STC) in a multiple-input multiple-output (MIMO) network to increase the reliability of spatial multiplexed MIMO transmissions.

In addition, the embodiments of the invention provide space time codes that can by used with higher order MIMO configurations, e.g., four or more transmit and receive antennas, and spatial multiplexing (SM) wherein self-interference among data streams is eliminated.

DETAILED DESCRIPTION OF THE PREFERRED EMBODIMENT

MIMO-OFDM with Spatial Multiplexing

Transmitter

Figure 1:
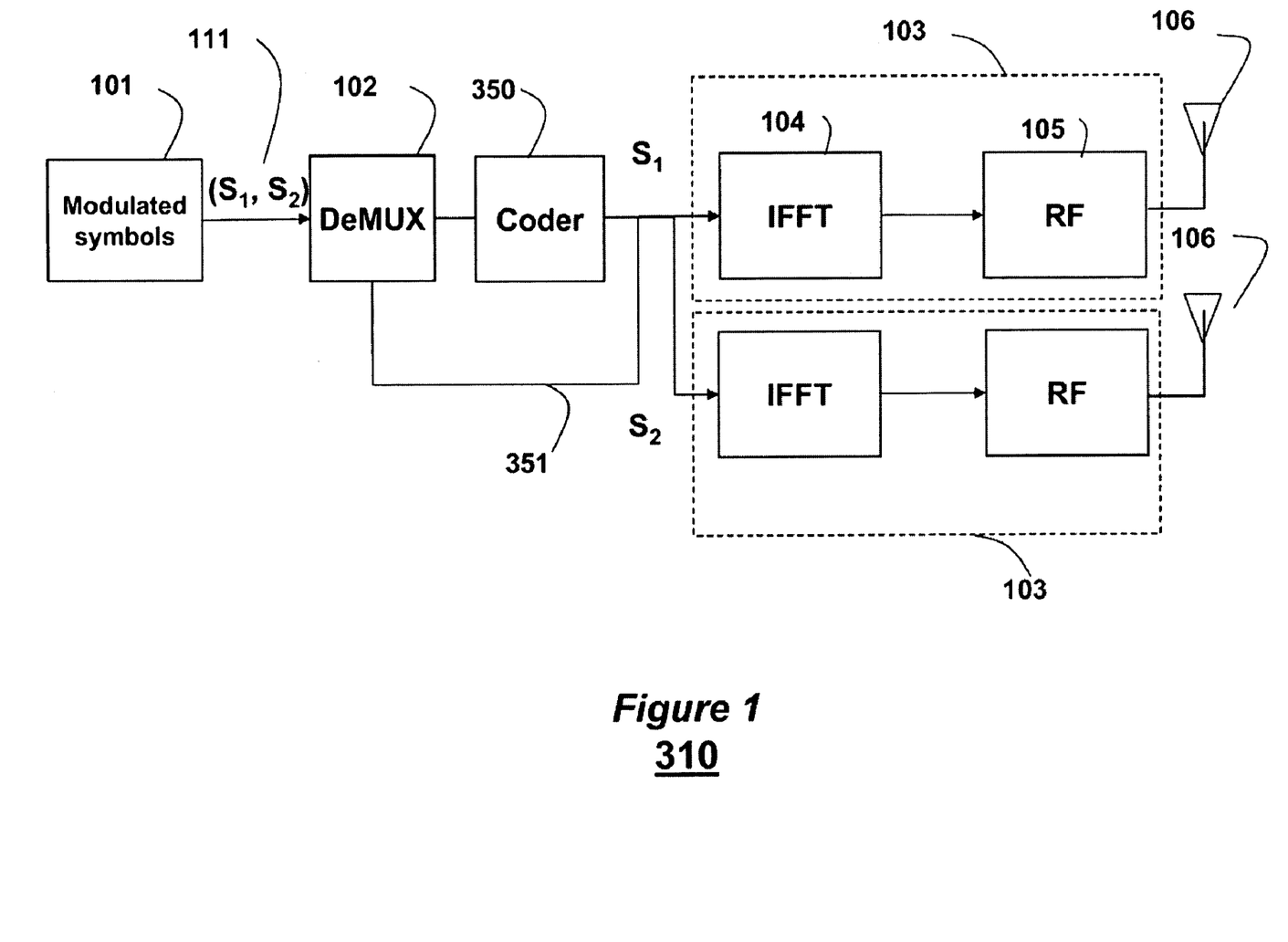
FIG. 1 is a block diagram of a MIMO transmitter according to embodiments of the invention.

FIG. 1 shows a multiple-input multiple-output (MIMO-OFDM) transmitter 310 with two transmit antennas 106. The transmitter includes a source 101 for coding modulated data symbols ($S_1$, $S_2$) 111 as a first block. The coding uses a first code, e.g., a forward error-correcting code (FEC), such as a turbo code, a convolutional code, a low-density parity-check (LDPC) code, and the like. The transmitter also includes a demultiplexer (DeMUX) 102, and two OFDM chains 103. Each OFDM chain includes an OFDM modulator that performs an inverse Fast Fourier transform (IFFT) 104 on the respective input symbols $S_1$ and $S_2$ and then filters, amplifies and converts the time domain signal to a passband carrier frequency in the RF block 105.

The transmitter also includes a coder 350. The coder is used during HARQ operations to recode the retransmitted symbols as a second block using an additional code that was not used to code the symbols for the first transmission. That is, the coder 350 is enabled only for retransmissions, and the symbols initially transmitted bypass 351 the coder 350.

The transmitter 310 uses spatial multiplexing (SM), wherein the sequence of modulated symbols 111 is transmitted via the two antennas 106. That is, for the two symbols $S_1$ and $S_2$, only one channel is required because symbol $S_1$ is transmitted by the first antenna, and symbol $S_2$ is transmitted concurrently by the second antenna to double the transmission rate. Generally, the transmission is $$S = \begin{bmatrix} S_1 \\ S_2 \end{bmatrix}.$$

Receiver

A receiver typically needs to have at least as many antennas as the transmitter to enable the detecting and decoding of the symbols transmitted by the two transmit antennas 106 to recover the symbols. Several receiver types are known.

An optimal receiver includes a maximum likelihood detector. Sub-optimal receivers can use minimum mean square error (MMSE) and zero forcing (ZF). The embodiments of the invention can be used in transmitters and receivers with a large number of antennas, and where spatial multiplexing (SM) and hybrid automatic repeat requests (HARQ) are used.

Channel Matrix

Figure 2A:
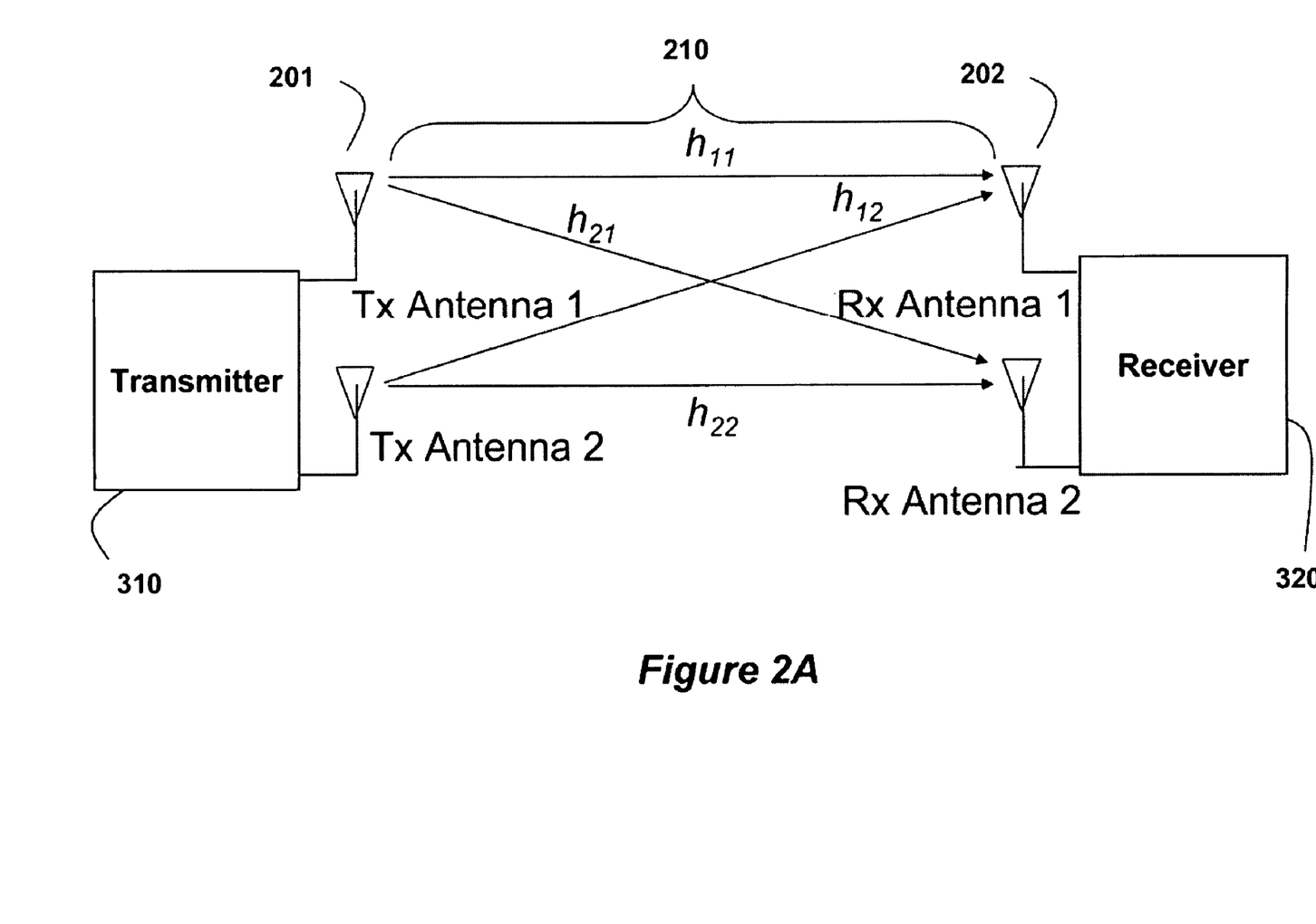
FIG. 2A is a schematic of a MIMI network according to embodiments of the invention.

FIG. 2A shows a MIMO network with a transmitter 310 and a receiver 320. The transmitters has multiple transmit antennas 201, and the receiver has multiple receive antennas 202, and a wireless channel 210 between the antennas. We first describe the case where SM is combined with HARQ. We represent the MIMO channel for each of the OFDM subcarriers as a matrix H. The matrix H is $$H = \begin{bmatrix} h_{1,1} & h_{1,2} \\ h_{2,1} & h_{2,2} \end{bmatrix},$$

where the elements $h_{i,j}$ are channel coefficients from the $j^{th}$ transmit antenna to the $i^{th}$ receive antenna. The received signal at the two antennas can be expressed in matrix form as $$\begin{bmatrix} r_1 \\ r_2 \end{bmatrix} = \begin{bmatrix} h_{1,1} & h_{1,2} \\ h_{2,1} & h_{2,2} \end{bmatrix} \begin{bmatrix} S_1 \\ S_2 \end{bmatrix} + \begin{bmatrix} n_1 \\ n_2 \end{bmatrix}.$$

This is equivalent to R=HS+n, where n is an additive white Gaussian noise vector and S is the vector of transmitted signals.

Figure 2B:
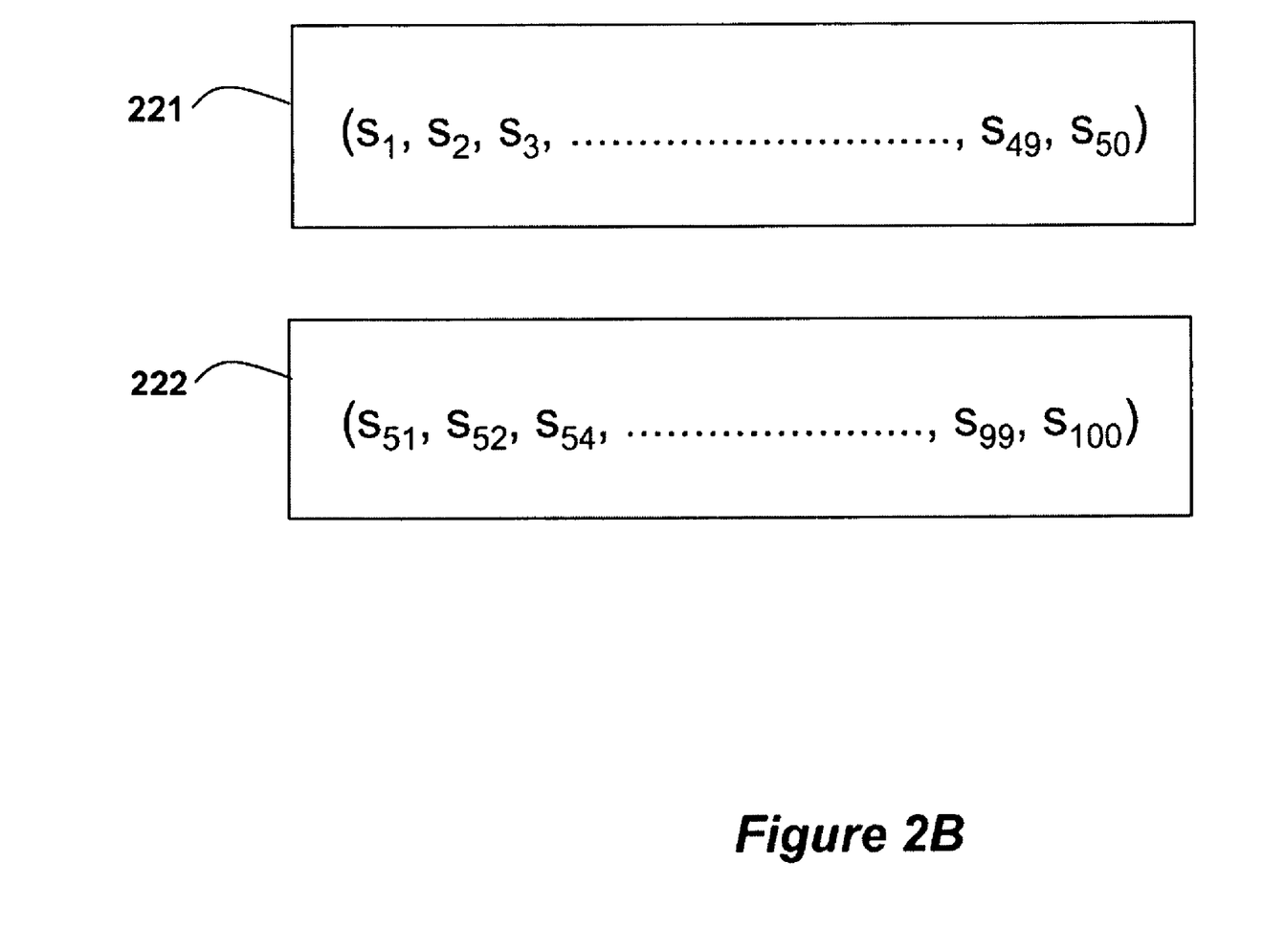
FIG. 2B is a block diagram of two blocks of symbols according to embodiments of the invention.

As shown in FIG. 2B for the purpose HARQ operation, the vector S is a vector of symbols rather then individual modulation symbols. The blocks are the modulated wave forms derived from the sequence of input symbols 111. Thus, the vector S is a vector of symbols that represents an entire block (or packet) of modulation symbols that are transmitted consecutively.

FIG. 2B shows two block 221-222 of fifty symbols. Symbols $s_1$ and $s_{50}$ are transmitted first, than symbols $s_2$, and so forth. Then, the entire blocks are decoded to determine whether or not the blocks need to be retransmitted or not.

The components of block $$S = \begin{bmatrix} s_1(k) \\ s_2(k) \end{bmatrix},$$

depend on a time index k. However, we omit the time index notation to simplify this description. The subscript indicates which antenna is used in the transmission.

The received signals at each receiver antenna can be represented by expanding the matrix equation to $$r_1 = h_{1,1}s_1 + h_{1,2}s_2 + n_1$$

$$r_2 = h_{2,1}s_1 + h_{2,2}s_2 + n_2$$

HARQ

Figure 3:
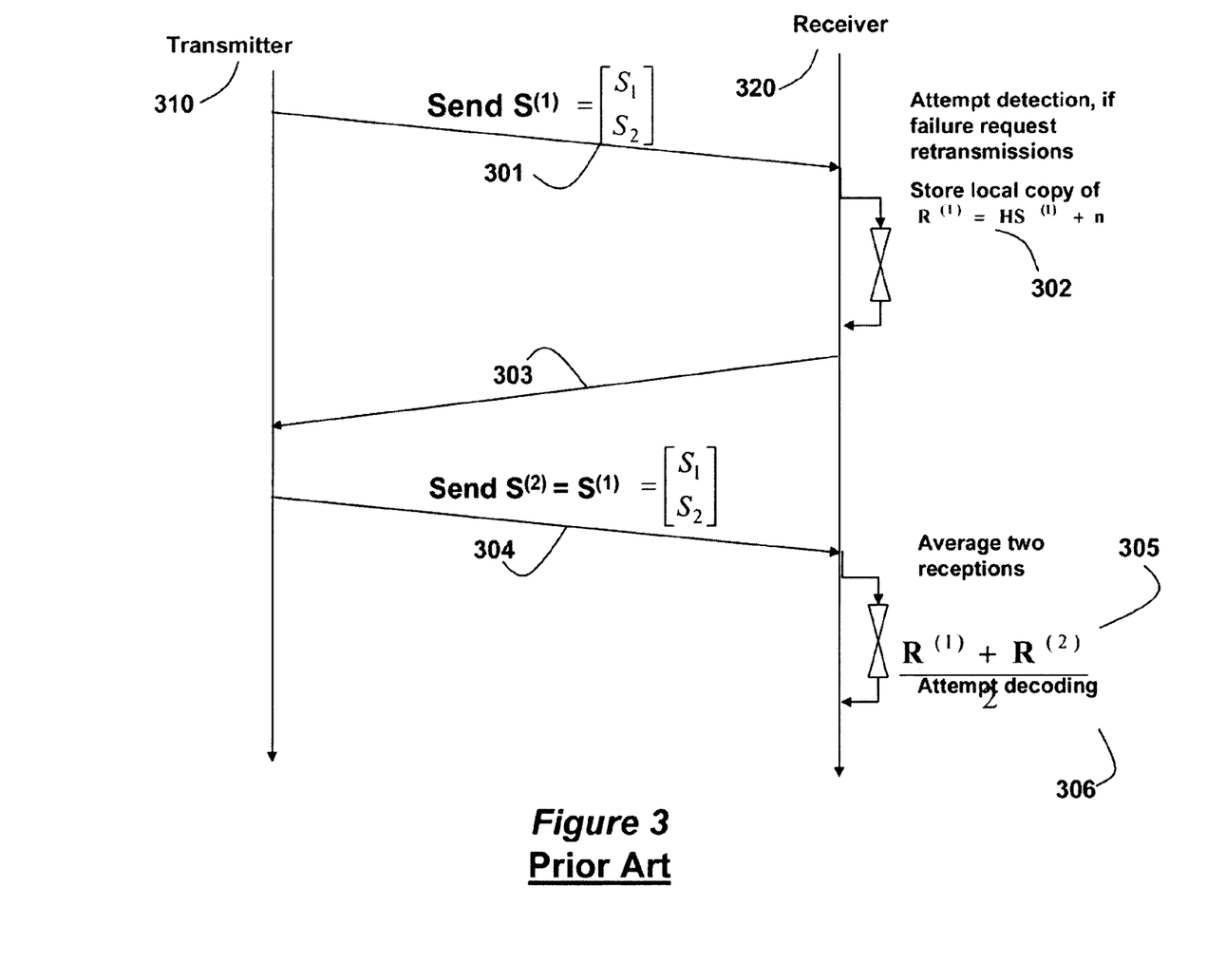
FIG. 3 is a timing diagram of conventional HARQ operations in a MIMO network.

FIG. 3 shows the operation of the conventional HARQ. The transmitter 310 transmits a first block of symbols $S^{(1)}$ 301. The receiver 320 operates on the vector R to detect the received block $S^{(1)}$ 302, which is stored in a memory at the receiver. The receiver also has the channel matrix H, which is used to detect the block S. The receiver can implement decoding schemes, such as MMSE or ZF to recover and estimate of the received signal $\hat{S}$. If the block is decoded correctly and the symbols are recovered, then no further processing or retransmission is required.

If decoding of the received signal is incorrect, that is, the estimate $\hat{S}$ is not equal to the vector S, then the HARQ operation starts. The receiver stores the first block 302 of the received signal R, and transmits a retransmission request 303.

In response to the retransmission request 303, the transmitter transmits an exact duplicate of the first block as a second block $S^{(2)}$ 304, where the superscript indicates the second transmission attempt. That is, in the conventional HARQ, there is no coder 350, and any retransmissions are identical to the initial transmission.

Thus, the two successive transmissions are $S^{(1)}$ and $S^{(2)}$, where $S^{(1)} \equiv S^{(2)}$. After reception of the retransmitted signal, the receiver has the two copies of the received signals $R^{(1)}$ and $R^{(2)}$. These can be expressed as $$\begin{bmatrix} r_1^{(1)} & r_1^{(2)} \\ r_2^{(1)} & r_2^{(2)} \end{bmatrix} = \begin{bmatrix} h_{1,1}s_1 + h_{1,2}s_2 + n_1^{(1)} & h_{1,1}s_1 + h_{1,2}s_2 + n_1^{(2)} \\ h_{2,1}s_1 + h_{2,2}s_2 + n_2^{(1)} & h_{2,1}s_1 + h_{2,2}s_2 + n_2^{(2)} \end{bmatrix}.$$

The terms $r_j^{(i)}$, represent the signal at the $j^{th}$ antenna due to the $i^{th}$ transmission, and $n_j^{(i)}$, is the noise at the $j^{th}$ antenna associated with the $i^{th}$ transmission. It should be noted that $n_j^{(i)}$, {j=1, 2, i=1, 2} are all independent identically (i.i.d.) distributed Gaussian with a variance $\sigma^2$.

The copies of the received signals are combined to improve the probability of success for the decoding 306 to recover the symbols. One common way to combine 305 the received signals $R^{(1)}$ and $R^{(2)}$ is to average the two vectors to obtain $$R' = \frac{R^{(1)} + R^{(2)}}{2}.$$

It should be noted that the HARQ can be repeated multiple times, and the averaging includes multiple retransmission blocks.

The combining operation 305 reduces the noise variance and power by a factor of two, and improves the decoding 306 to correctly recover the symbols. However, there still remains an interference term for the received signal at each antenna, which can be seen by expressing R as $$\begin{bmatrix} r_1' \\ r_2' \end{bmatrix} = \begin{bmatrix} (h_{1,1}s_1 + h_{1,2}s_2) + n_1' \\ (h_{2,1}s_1 + h_{2,2}s_2) + n_2' \end{bmatrix}.$$

Self Interference

The terms $h_{1,2} s_2$ and $h_{2,1} s_1$ are the interference terms at receive antenna 1 from transmit antenna 2, and receive antenna 2 from transmit antenna 1, respectively.

This type of interference is typically called self interference, because it is due to the transmission of multiple streams from multiple antennas. Thus, the two transmissions reduce the noise power but do not eliminate the self interference. It should be noted that self interference increases as the number of antennas increase. Therefore, the embodiments of the invention, which eliminate self-interference, are important in MIMO transceivers with a larger number of antennas, e.g., four or more.

HARQ with STC

Figure 4:
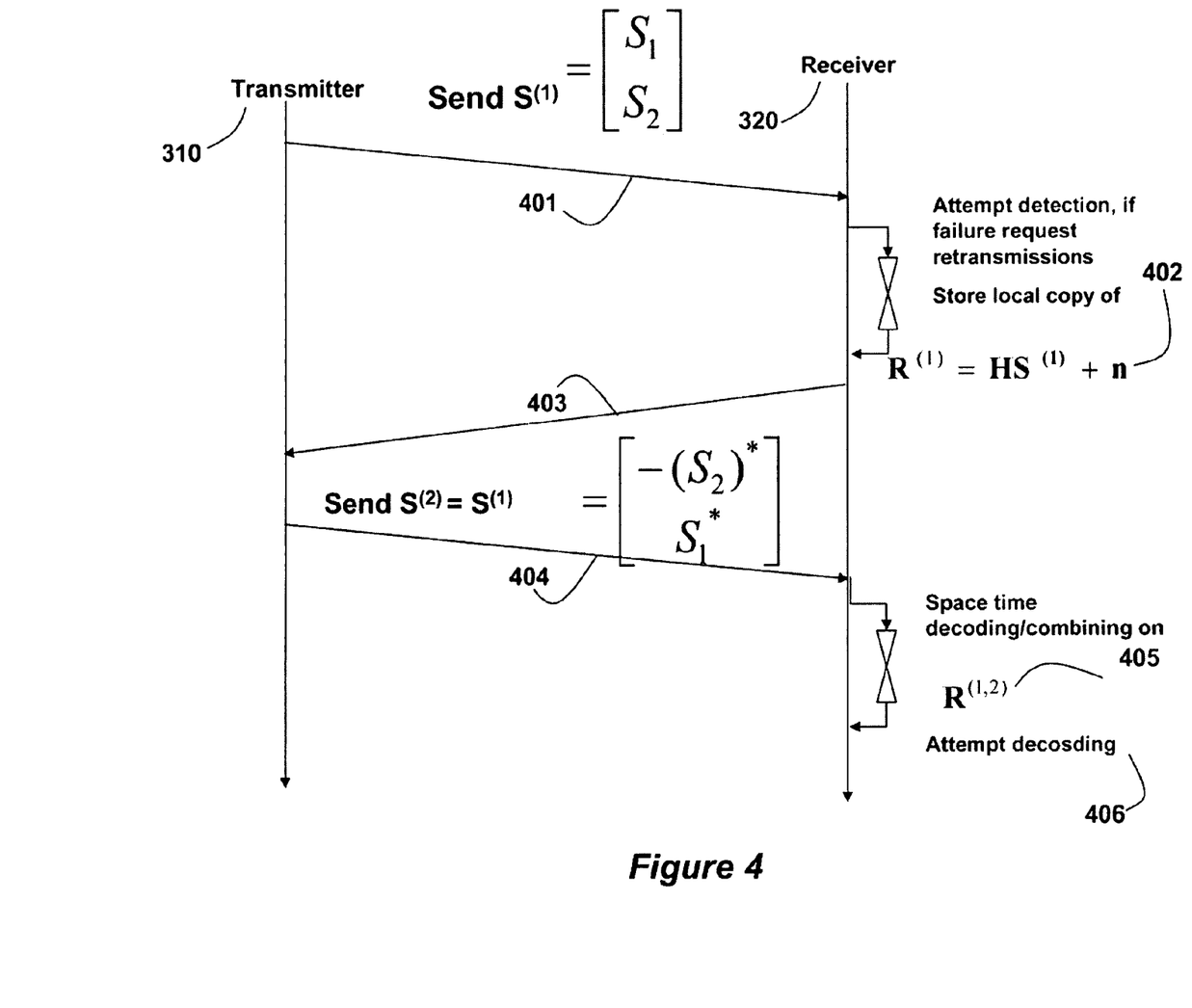
FIG. 4 is a timing diagram of HARQ with STC in a MIMO network according to embodiments of the invention.

To eliminate self interference, we perform additional coding 350 with a second code that is different than the first code during the retransmission using a second code, different than the first code.

As shown in FIG. 4 for one embodiment, the second code is a space-time code (STC). One STC is the well know Alamouti code, which has the general form $$S = \begin{bmatrix} S_1 & -S_2^* \\ S_2 & S_1^* \end{bmatrix}.$$

The symbols in the first column are transmitted first by the antennas indicated by the subscripts, followed by the complex conjugate (*) of the symbols and a reversal of the antennas in the next successive time interval. In this case, the retransmission is encoded in a way that enables the receiver to eliminate the self interference.

The first transmission of the first block 401 is conventional $$S^{(1)} = \begin{bmatrix} S_1 \\ S_2 \end{bmatrix}.$$

If decoding fails, then the receiver stores the received signal $R^{(1)}$ 402, and a retransmission 403 is requested. The transmitter 310 transmits the following coded set of signals 404 as the second block $$S^{(2)} = \begin{bmatrix} -(S_2)^* \\ (S_1)^* \end{bmatrix},$$

which is the result of space-time coding by the coder 350. Thus, the coding that is used for the retransmission is different than the coding that is used for the initial transmission.

At the receiver 320, the matrix $R^{(1,2)}$ represents the received signals at both antennas were the first column is due to the transmission of the first block $S^{(1)}$, and the second successive column in due to the retransmission of the block $S^{(2)}$, that is $$R^{(1,2)} = H[S^{(1)} \quad S^{(2)}] + n^{(1,2)}$$
$$= \begin{bmatrix} h_{1,1} & h_{1,2} \\ h_{2,1} & h_{2,2} \end{bmatrix} \begin{bmatrix} S_1 & -(S_2)^* \\ S_2 & (S_1)^* \end{bmatrix} + n^{(1,2)}$$
$$= \begin{bmatrix} h_{1,1}S_1 + h_{1,2}S_2 & -h_{1,1}(S_2)^* + h_{1,2}(S_1)^* \\ h_{2,1}S_1 + h_{2,2}S_2 & -h_{2,1}(S_2)^* + h_{2,2}(S_1)^* \end{bmatrix} + \begin{bmatrix} n_1^{(1)} & n_1^{(2)} \\ n_2^{(1)} & n_2^{(2)} \end{bmatrix}.$$

The signals at the receiver can be combined 405 and decoded 406 according to the following equations to obtain For $S_1$ $$h_{1,1}^*(h_{1,1}S_1 + h_{1,2}S_2 + n_1^{(1)}) +$$
$$h_{1,2}(-h_{1,1}(S_2)^* + h_{1,2}(S_1)^* + n_1^{(2)})^* h_{2,1}^*(h_{2,1}S_1 + h_{2,2}S_2 + n_2^{(1)}) +$$
$$h_{2,2}(-h_{2,1}(S_2)^* + h_{2,2}(S_1)^* + n_2^{(2)})^* =$$
$$(|h_{1,1}|^2 + |h_{1,2}|^2 + |h_{2,1}|^2 + |h_{2,2}|^2) \cdot S_1 + n_1'$$

For $S_2$ $$h_{1,2}^*(h_{1,1}S_1 + h_{1,2}S_2 + n_1^{(1)}) -$$
$$h_{1,1}(-h_{1,1}(S_2)^* + h_{1,2}(S_1)^* + n_1^{(2)})^* h_{2,2}^*(h_{2,1}S_1 + h_{2,2}S_2 + n_2^{(1)}) -$$
$$h_{2,1}(-h_{2,1}(S_2)^* + h_{2,2}(S_1)^* + n_2^{(2)})^* =$$
$$(|h_{1,1}|^2 + |h_{1,2}|^2 + |h_{2,1}|^2 + |h_{2,2}|^2) \cdot S_2 + n_2',$$

where $$n_1' = h_{1,1}*n_1^{(1)} + h_{1,2}*(n_1^{(2)})* + h_{2,1}*n_2^{(1)} - h_{2,3}(n_2^{(2)})*,$$

$$n_2' = h_{1,2}*n_1^{(1)} - h_{1,1}(n_1^{(2)})* + h_{2,2}*n_2^{(1)} - h_{2,1}(n_2^{(2)})*.$$

With this combining scheme, the self inference between antennas is completely eliminated, and the symbols can be recovered. Essentially, if we recode the retransmitted signals and use a slightly more complex combining at the receiver, we eliminate the self interference.

After the combing 405, the receiver attempts to decode 406 the transmitted block of symbols S. Because the combined signal no longer contains any self interference, the probability of correct decoding 406 and recovering the symbols increases.

It should be noted that additional retransmissions are possible, wherein each retransmission is recoded by the coder 350.

HARQ with SICC

Figure 5:
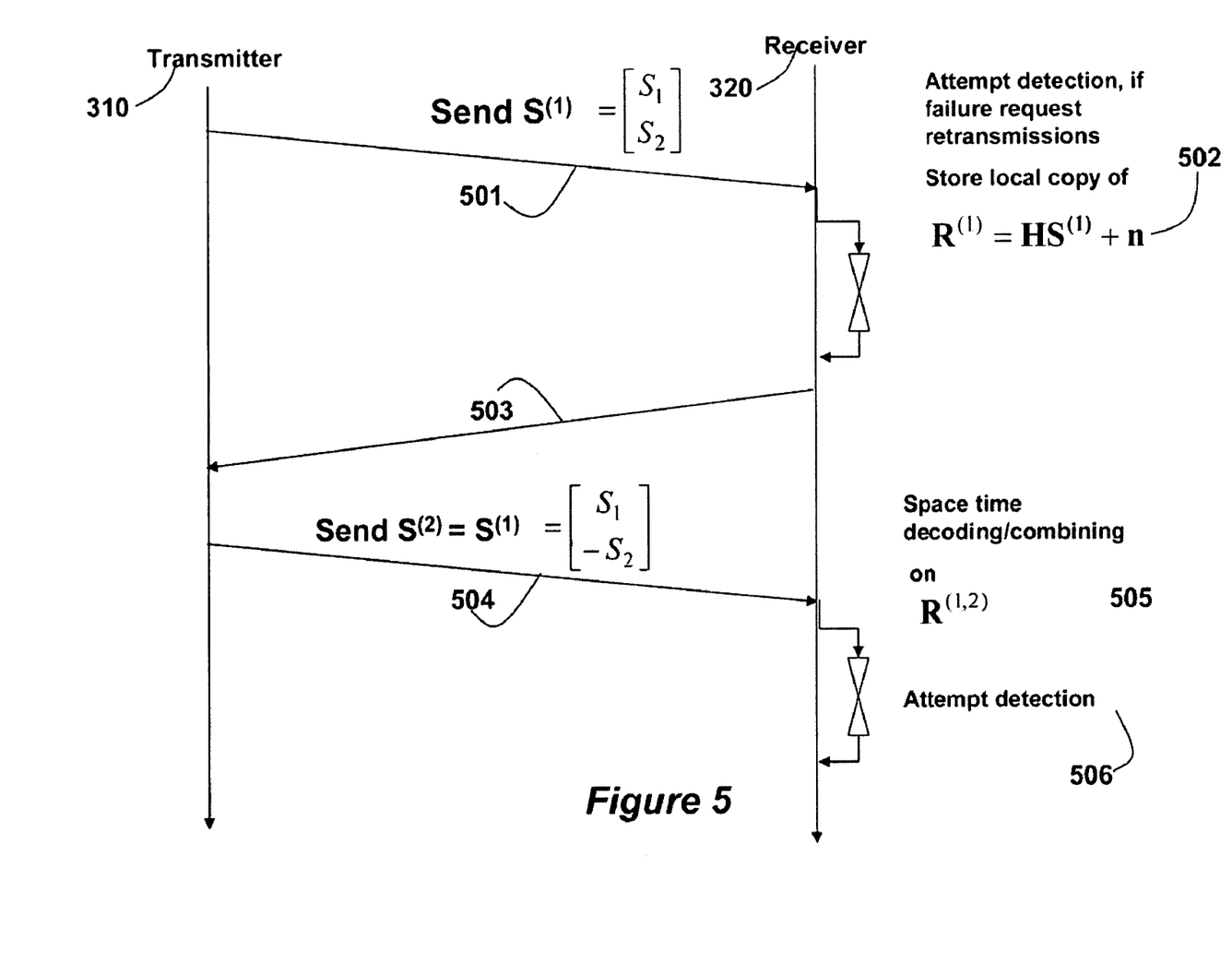
FIG. 5 is a timing diagram of HARQ with SICC in a MIMO network according to embodiments of the invention.

Other coding can be used in the coder 350 to eliminate the self interference for a HARQ transmission. Another second code is a self-interference cancellation code (SICC) as shown in FIG. 5. This is similar to the STC coding of the HARQ retransmissions, but is simpler to implement and is based on Hadamard matrices, a well known generalized class of discrete Fourier transform matrices.

We have a 2×2 antenna network, and we denote $S=[S_1 \ S_2]^T$ as a vector of signals (block of symbols) transmitted 501 from the two transmit antennas. After reception of the signal R=HS+n 502, and a failure in the decoding, the HARQ process is initiated and a request for a retransmission 503 is sent to the transmitter. The retransmission 504 is coded 350 according to a second code $$S^{(2)} = \begin{bmatrix} S_1 \\ -S_2 \end{bmatrix},$$

wherein the signal transmitted from the second antenna is simply negated.

At receiver 320, the two received signals are $$R^{(1,2)} = H[S^{(1)}S^{(2)}] + n^{(1,2)}.$$

Expanding $R^{(1,2)}$, we obtain $$R^{(1,2)} = H[S^{(1)} \quad S^{(2)}] + n^{(1,2)}$$
$$= \begin{bmatrix} h_{1,1} & h_{1,2} \\ h_{2,1} & h_{2,2} \end{bmatrix} \begin{bmatrix} S_1 & (S_1) \\ S_2 & (-S_2) \end{bmatrix} + n^{(1,2)}$$
$$= \begin{bmatrix} h_{1,1}S_1 + h_{1,2}S_2 & h_{1,1}(S_1) - h_{1,2}(S_2) \\ h_{2,1}S_1 - h_{2,2}S_2 & h_{2,1}(S_1) - h_{2,2}(S_2) \end{bmatrix} + \begin{bmatrix} n_1^{(1)} & n_1^{(2)} \\ n_2^{(1)} & n_2^{(2)} \end{bmatrix}.$$

The combining 505 for SICC begins with the multiplication of the received matrix ($R^{(1,2)}$) by the 2×2 Hadamard matrix yielding, $$R^{(1,2)'} = R^{(1,2)} \begin{bmatrix} 1 & 1 \\ 1 & -1 \end{bmatrix}$$
$$= 2 \begin{bmatrix} h_{11}S_1 & h_{12}S_2 \\ h_{21}S_1 & h_{22}S_2 \end{bmatrix} + \begin{bmatrix} n_1^{(1)} + n_1^{(2)} & n_1^{(1)} - n_1^{(2)} \\ n_2^{(1)} + n_2^{(2)} & n_2^{(1)} - n_2^{(2)} \end{bmatrix}.$$

Thus, the signal component of the matrix $R^{(1,2)'}$ contains two columns, were the first column depends only on the signal $S_1$ and the second column depends only on the signal $S_2$. We can combine the signals by multiply the first column of the matrix $R^{(1,2)'}$ by the vector $[h_{11}*h_{21}*]^T$, and the second column of the matrix $R^{(1,2)'}$ by the vector $[h_{12}*h_{22}*]^T$. These yields where $$n'_1 = h^*_{1,1} n'_{1,1} + h^*_{2,1} n'_{2,1},$$

$$n'_2 = h^*_{1,2} n'_{1,2} + h^*_{2,2} n'_{2,2},$$

and $$\begin{bmatrix} n'_{1,1} & n'_{1,2} \\ n'_{2,1} & n'_{2,2} \end{bmatrix} \cdots = \begin{bmatrix} n_1^{(1)} + n_1^{(2)} & n_1^{(1)} - n_1^{(2)} \\ n_2^{(1)} + n_2^{(2)} & n_2^{(1)} - n_2^{(2)} \end{bmatrix}.$$

Thus, the SICC combining yields signals where the self interference has been eliminated, and thus the probability of correct decoding 506 improves over conventional HARQ with SM.

If after the initial HARQ retransmission $S^{(2)}$, the receiver still detects an error in the decoding on the signals $S_1$, and $S_2$, then an additional retransmission can be requested. Denoting $S^{(j)}$ as the $j^{th}$ HARQ transmission, at the receiver, we have $$r^{(1,2,\cdots)} = H[S^{(1)} S^{(2)} S^{(3)} S^{(4)} \cdots] + n^{(1,2,\cdots)}.$$

By same combining scheme for SICC, we process the signals arriving at each antenna with a repeated Hadamard matrix $$r^{(1,2,\cdots)} \begin{bmatrix} 1 & 1 & 1 & 1 & \cdots \\ 1 & -1 & 1 & -1 & \cdots \end{bmatrix},$$

where superscripts represent instances of receiving the second block, and $$2h_{1,1} S_1 h_{1,1}^* + 2h_{2,1} S_1 h_{2,1}^* + 2h_{1,1} S_1 h_{1,1}^* + 2h_{2,1} S_1 h_{2,1}^* + \cdots + n_1' = 2(|h_{1,1}|^2 + |h_{2,1}|^2 + |h_{1,1}|^2 + |h_{2,1}|^2 + \cdots) \cdot S_1 + n_1'$$

$$2h_{1,2} S_2 h_{1,2}^* + 2h_{2,2} S_2 h_{2,2}^* + 2h_{1,2} S_2 h_{1,2}^* + 2h_{2,2} S_2 h_{2,2}^* + \cdots + n_2' = 2(|h_{1,2}|^2 + |h_{2,2}|^2 + |h_{1,2}|^2 + |h_{2,2}|^2 + \cdots) \cdot S_2 + n_2'$$

where $$\begin{bmatrix} n'_{1,1} & n'_{1,2} & \cdots \\ n'_{2,1} & n'_{2,2} & \end{bmatrix} = \begin{bmatrix} n_1^{(1)} + n_1^{(2)} & n_1^{(1)} - n_1^{(2)} & \cdots \\ n_2^{(1)} + n_2^{(2)} & n_2^{(1)} - n_2^{(2)} & \end{bmatrix}.$$

Coding for Large Antenna Configurations in MIMO Networks

By combining the SICC and STC schemes on the initial transmission, we can achieve new MIMO codes that eliminate self interference for transceivers with a large number of antennas. In the following, we assume four transmit antennas and four receive antennas. However, it should be understood that the number of transmit and receive antennas can be smaller or larger by altering the matrices described below accordingly.

We process on a per modulated symbol, rather then on the entire signal for a block of symbols. That is, the transmitted signals $S=[S_1 \; S_2 \; S_3 \; S_4]^T$ represents a vector of individual symbols, rather then a block of symbols transmitted by each antenna as described above. The transpose operator is T. Also, we assume that the receiver has the channel matrix H, e.g., for four transmit antennas, and four receive antennas:

$$H = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{4,4} \\ h_{4,1} & h_{4,2} & h_{4,3} & h_{3,4} \end{bmatrix}.$$

During the transmission of each symbol, we use the STC coding and the SICC coding to obtains the following matrix:

$$S = \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix}.$$

Here each successive column of the matrix S represents the symbols transmitted at each transmission interval, and the subscripts index the set of antennas. The structure of the first two columns of the matrix S can be seen to be an "Alamouti type" code on the symbols $S_1$ and $S_2$ transmitted by antennas 1 and 2, while a second Alamouti type code on symbols $S_3$ and $S_4$ transmitted by antennas 3 and 4. The next two columns repeat the Alamouti code. However, the symbols on antennas 3 and 4 are just negated as in the SICC code described above.

If the encoding is done on an individual symbol basis, rather then a block basis as described above, then the transmitter sends the four columns of the matrix, S, in as a stream. That is all four columns are sent successively before feedback from the transmitter is expected. Essentially, the matrix S represents a space time code that is used without the HARQ protocol.

Additionally, the receiver waits until all four columns are received before attempting to detect and decode the vector $S=[S_1, S_2, S_3, S_4]^T$, here T is the transpose operator.

After all four columns of the matrix S have been transmitted, the received signal is $$r = HS + n = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix} + n,$$

where noise n is $$n = \begin{bmatrix} n_{1,1} & n_{1,2} & n_{1,3} & n_{1,4} \\ n_{2,1} & n_{2,2} & n_{2,3} & n_{2,4} \\ n_{3,1} & n_{3,2} & n_{3,3} & n_{3,4} \\ n_{4,1} & n_{4,2} & n_{4,3} & n_{4,4} \end{bmatrix}.$$

If we set $$r = \begin{bmatrix} r_{1,1} & r_{1,2} & r_{1,3} & r_{1,4} \\ r_{2,1} & r_{2,2} & r_{2,3} & r_{2,4} \\ r_{3,1} & r_{3,2} & r_{3,3} & r_{3,4} \\ r_{4,1} & r_{4,2} & r_{4,3} & r_{4,4} \end{bmatrix},$$

then the combining of the symbols from each antenna can be expressed for the first symbol $S_1$, $$[r_{1,1} \ r_{1,2}^* \ r_{1,3} \ r_{1,4}^*]\begin{bmatrix} h_{1,1}^* \\ h_{1,2} \\ h_{1,1}^* \\ h_{1,2} \end{bmatrix} + [r_{2,1} \ r_{2,2}^* \ r_{2,3} \ r_{2,4}^*]\begin{bmatrix} h_{2,1}^* \\ h_{2,2} \\ h_{2,1}^* \\ h_{2,2} \end{bmatrix} =$$

$$2(|h_{1,1}|^2 + |h_{1,2}|^2 + |h_{2,1}|^2 + |h_{2,2}|^2)S_1 + n_1'.$$

for the second symbol $S_2$, $$[r_{1,1} \ r_{1,2}^* \ r_{1,3} \ r_{1,4}^*]\begin{bmatrix} h_{1,2}^* \\ -h_{1,1} \\ h_{1,2}^* \\ -h_{1,1} \end{bmatrix} + [r_{2,1} \ r_{2,2}^* \ r_{2,3} \ r_{2,4}^*]\begin{bmatrix} h_{2,2}^* \\ -h_{2,1} \\ h_{2,2}^* \\ -h_{2,1} \end{bmatrix} =$$

$$2(|h_{1,1}|^2 + |h_{1,2}|^2 + |h_{2,1}|^2 + |h_{2,2}|^2)S_2 + n_2'$$

for the third symbol $S_3$, $$[r_{3,1} \ r_{3,2}^* \ r_{3,3} \ r_{3,4}^*]\begin{bmatrix} h_{3,3}^* \\ h_{3,4} \\ -h_{3,3}^* \\ -h_{3,4} \end{bmatrix} + [r_{4,1} \ r_{4,2}^* \ r_{4,3} \ r_{4,4}^*]\begin{bmatrix} h_{4,3}^* \\ h_{4,4} \\ -h_{4,3}^* \\ -h_{4,4} \end{bmatrix} =$$

$$2(|h_{3,3}|^2 + |h_{3,4}|^2 + |h_{4,3}|^2 + |h_{4,4}|^2)S_3 + n_3'$$

and for the fourth symbol $S_4$, $$[r_{3,1} \ r_{3,2}^* \ r_{3,3} \ r_{3,4}^*]\begin{bmatrix} h_{3,4}^* \\ -h_{3,3} \\ -h_{3,4}^* \\ h_{3,3} \end{bmatrix} + [r_{4,1} \ r_{4,2}^* \ r_{4,3} \ r_{4,4}^*]\begin{bmatrix} h_{4,4}^* \\ -h_{4,3} \\ -h_{4,4}^* \\ h_{4,3} \end{bmatrix} =$$

$$2(|h_{3,3}|^2 + |h_{3,4}|^2 + |h_{4,3}|^2 + |h_{4,4}|^2)S_4 + n_4'.$$

The combining yields four symbols that contain no self-interference terms, and thus simple detection schemes can be applied to estimate the transmitted symbols.

For 4×4 STC+SICC, with Hadamard and Alamouti coding, $$H = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix},$$

four transmit antennas, and four receive antennas.

For SICC the 2×2 STC 4 grouping case, with a diversity order 4+4+4+4, and a multiplex rate 1, $$S = \begin{bmatrix} S_1 & -S_2^* & S_5 & -S_6^* & S_1 & -S_2^* & S_5 & -S_6^* \\ S_2 & S_1^* & S_7 & -S_8^* & S_2 & S_1^* & -S_7 & S_8^* \\ S_3 & -S_4^* & S_6 & S_5^* & -S_3 & S_4^* & S_6 & S_5^* \\ S_4 & S_3^* & S_8 & S_7^* & -S_4 & -S_3^* & -S_8 & -S_7^* \end{bmatrix}.$$

At the receiver, the received signal is $$r = HS + n$$

$$= \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix}$$

$$\begin{bmatrix} S_1 & -S_2^* & S_5 & -S_6^* & S_1 & -S_2^* & S_5 & -S_6^* \\ S_2 & S_1^* & S_7 & -S_8^* & S_2 & S_1^* & -S_7 & S_8^* \\ S_3 & -S_4^* & S_6 & S_5^* & -S_3 & S_4^* & S_6 & S_5^* \\ S_4 & S_3^* & S_8 & S_7^* & -S_4 & -S_3^* & -S_8 & -S_7^* \end{bmatrix} + n,$$

where $$n = \begin{bmatrix} n_{1,1} & n_{1,2} & n_{1,3} & n_{1,4} & n_{1,5} & n_{1,6} & n_{1,7} & n_{1,8} \\ n_{2,1} & n_{2,2} & n_{2,3} & n_{2,4} & n_{2,5} & n_{2,6} & n_{2,7} & n_{2,8} \\ n_{3,1} & n_{3,2} & n_{3,3} & n_{3,4} & n_{3,5} & n_{3,6} & n_{3,7} & n_{3,8} \\ n_{4,1} & n_{4,2} & n_{4,3} & n_{4,4} & n_{4,5} & n_{4,6} & n_{4,7} & n_{4,8} \end{bmatrix}.$$

This decodes as $$r = \begin{bmatrix} r_{1,1} & r_{1,2} & r_{1,3} & r_{1,4} & r_{1,5} & r_{1,6} & r_{1,7} & r_{1,8} \\ r_{2,1} & r_{2,2} & r_{2,3} & r_{2,4} & r_{2,5} & r_{2,6} & r_{2,7} & r_{2,8} \\ r_{3,1} & r_{3,2} & r_{3,3} & r_{3,4} & r_{3,5} & r_{3,6} & r_{3,7} & r_{3,8} \\ r_{4,1} & r_{4,2} & r_{4,3} & r_{4,4} & r_{4,5} & r_{4,6} & r_{4,7} & r_{4,8} \end{bmatrix}$$

for $S_1$, $$[r_{1,1} \ r_{1,2}^* \ r_{1,5} \ r_{1,6}^*]\begin{bmatrix} h_{1,1}^* \\ h_{1,2} \\ h_{1,1}^* \\ h_{1,2} \end{bmatrix} + [r_{2,1} \ r_{2,2}^* \ r_{2,5} \ r_{2,6}^*]\begin{bmatrix} h_{2,1}^* \\ h_{2,2} \\ h_{2,1}^* \\ h_{2,2} \end{bmatrix} =$$

$$2(|h_{1,1}|^2 + |h_{1,2}|^2 + |h_{2,1}|^2 + |h_{2,2}|^2)S_1 + n_1'$$

for $S_2$, $$[r_{1,1} \ r_{1,2}^* \ r_{1,5} \ r_{1,6}^*]\begin{bmatrix} h_{1,2}^* \\ -h_{1,1} \\ h_{1,2}^* \\ -h_{1,1} \end{bmatrix} + [r_{2,1} \ r_{2,2}^* \ r_{2,5} \ r_{2,6}^*]\begin{bmatrix} h_{2,2}^* \\ -h_{2,1} \\ h_{2,2}^* \\ -h_{2,1} \end{bmatrix} =$$

$$2(|h_{1,1}|^2 + |h_{1,2}|^2 + |h_{2,1}|^2 + |h_{2,2}|^2)S_2 + n_2'.$$

for $S_3$, $$[r_{3,1} \ r_{3,2}^* \ r_{3,5} \ r_{3,6}^*]\begin{bmatrix} h_{3,3}^* \\ h_{3,4} \\ -h_{3,3}^* \\ -h_{3,4} \end{bmatrix} + [r_{4,1} \ r_{4,2}^* \ r_{4,5} \ r_{4,6}^*]\begin{bmatrix} h_{4,3}^* \\ h_{4,4} \\ -h_{4,3}^* \\ -h_{4,4} \end{bmatrix} =$$

$$2(|h_{3,3}|^2 + |h_{3,4}|^2 + |h_{4,3}|^2 + |h_{4,4}|^2)S_3 + n_3'$$

for $S_4$, $$[r_{3,1} \ r_{3,2}^* \ r_{3,5} \ r_{3,6}^*]\begin{bmatrix} h_{3,4}^* \\ -h_{3,3} \\ -h_{3,4}^* \\ h_{3,3} \end{bmatrix} + [r_{4,1} \ r_{4,2}^* \ r_{4,5} \ r_{4,6}^*]\begin{bmatrix} h_{4,4}^* \\ -h_{4,3} \\ -h_{4,4}^* \\ h_{4,3} \end{bmatrix} =$$

$$2(|h_{3,3}|^2 + |h_{3,4}|^2 + |h_{4,3}|^2 + |h_{4,4}|^2)S_4 + n_4'$$

for $S_5$,

-continued $$[r_{1,3}\ r^*_{1,4}\ r_{1,7}\ r^*_{1,8}]\begin{bmatrix}h^*_{1,1}\\h_{1,3}\\h^*_{1,1}\\h_{1,3}\end{bmatrix} + [r_{3,3}\ r^*_{3,4}\ r_{3,7}\ r^*_{3,8}]\begin{bmatrix}h^*_{3,1}\\h_{3,3}\\h^*_{3,1}\\h_{3,3}\end{bmatrix} =$$

$$2(|h_{1,1}|^2 + |h_{1,3}|^2 + |h_{3,1}|^2 + |h_{3,3}|^2)S_5 + n'_5$$

for $S_6$, $$[r_{1,3}\ r^*_{1,4}\ r_{1,7}\ r^*_{1,8}]\begin{bmatrix}h^*_{1,3}\\-h_{1,1}\\h^*_{1,3}\\-h_{1,1}\end{bmatrix} + [r_{3,3}\ r^*_{3,4}\ r_{3,7}\ r^*_{3,8}]\begin{bmatrix}h^*_{3,3}\\-h_{3,1}\\h^*_{3,3}\\-h_{3,1}\end{bmatrix} =$$

$$2(|h_{1,1}|^2 + |h_{1,3}|^2 + |h_{3,1}|^2 + |h_{3,3}|^2)S_6 + n'_6$$

for $S_7$, $$[r_{2,3}\ r^*_{2,4}\ r_{2,7}\ r^*_{2,8}]\begin{bmatrix}h^*_{2,2}\\h_{2,4}\\-h^*_{2,2}\\-h_{2,4}\end{bmatrix} + [r_{4,3}\ r^*_{4,4}\ r_{4,7}\ r^*_{4,8}]\begin{bmatrix}h^*_{4,2}\\h_{4,4}\\-h^*_{4,2}\\-h_{4,4}\end{bmatrix} =$$

$$2(|h_{2,2}|^2 + |h_{2,4}|^2 + |h_{4,2}|^2 + |h_{4,4}|^2)S_7 + n'_7$$

for $S_8$, $$[r_{2,3}\ r^*_{2,4}\ r_{2,7}\ r^*_{2,8}]\begin{bmatrix}h^*_{2,4}\\-h_{2,2}\\-h^*_{2,4}\\h_{2,2}\end{bmatrix} + [r_{4,3}\ r^*_{4,4}\ r_{4,7}\ r^*_{4,8}]\begin{bmatrix}h^*_{4,4}\\-h_{4,2}\\-h^*_{4,4}\\h_{4,2}\end{bmatrix} =$$

$$2(|h_{2,2}|^2 + |h_{2,4}|^2 + |h_{4,2}|^2 + |h_{4,4}|^2)S_8 + n'_8.$$

Extensions to Space-Frequency Block Coding

The above MIMO encoding has been described in the context of space time coding (STC), where each column of the transmission matrix, S, represents an index of a distinct symbol.

The invention can also be used with Space-Frequency Block Coding (SFBC). SFBC is a scheme for transmitting symbols of a space diversity coding on adjacent sub-carriers, rather than on the same sub-carrier in the successive time slots as in STC.

The SFBC avoids the problem of fast time variations in space time block coding. In this case, we need only consider that the successive columns of matrix S represents a frequency sub-carrier, rather then a time index.

Thus, we distribute the symbols ($S_1$, $S_2$, $S_3$, $S_4$) across space and frequency. Specifically, we can consider each column of the transmission matrix as a unique sub-carrier in a MIMO-OFDM system configuration. With this embodiment, the above described coding for transmission can be directly applicable.

It is to be understood that various other adaptations and modifications can be made within the spirit and scope of the invention. Therefore, it is the object of the appended claims to cover all such variations and modifications as come within the true spirit and scope of the invention.

We claim:

1. A method for transmitting a sequence of symbols $S_n$ in a multiple-input multiple-output (MIMO) network including a transmitter having a set of transmit antennas and a receiver having a set of receive antennas, comprising the steps of:

representing the sequence of symbols by a vector $S=[S_1\ S_2\ S_3\ S_4]^T$ of individual symbols, where T is a transpose operator; and using a coder transmitting the individual symbols as a transmit matrix is $$S = \begin{bmatrix}S_1 & -S^*_2 & S_1 & -S^*_2\\S_2 & S^*_1 & S_2 & S^*_1\\S_3 & -S^*_4 & -S_3 & S^*_4\\S_4 & S^*_3 & -S_4 & -S^*_3\end{bmatrix},$$

where * is a complex conjugate, and wherein each column of the matrix S represents the symbols transmitted, and subscripts index the set of transmit antennas, wherein the receiver has a channel matrix $$H = \begin{bmatrix}h_{1,1} & h_{1,2} & h_{1,3} & h_{1,4}\\h_{2,1} & h_{2,2} & h_{2,3} & h_{2,4}\\h_{3,1} & h_{3,2} & h_{3,3} & h_{4,4}\\h_{4,1} & h_{4,2} & h_{4,3} & h_{3,4}\end{bmatrix},$$

where elements $h_{i,j}$ are channel coefficients from the $j^{th}$ transmit antenna to the $i^{th}$ receive antenna, wherein a received signal r is $$r = HS + n$$
$$= \begin{bmatrix}h_{1,1} & h_{1,2} & h_{1,3} & h_{1,4}\\h_{2,1} & h_{2,2} & h_{2,3} & h_{2,4}\\h_{3,1} & h_{3,2} & h_{3,3} & h_{3,4}\\h_{4,1} & h_{4,2} & h_{4,3} & h_{4,4}\end{bmatrix}\begin{bmatrix}S_1 & -S^*_2 & S_1 & -S^*_2\\S_2 & S^*_1 & S_2 & S^*_1\\S_3 & -S^*_4 & -S_3 & S^*_4\\S_4 & S^*_3 & -S_4 & -S^*_3\end{bmatrix} + n,$$

where noise n is $$n = \begin{bmatrix}n_{1,1} & n_{1,2} & n_{1,3} & n_{1,4}\\n_{2,1} & n_{2,2} & n_{2,3} & n_{2,4}\\n_{3,1} & n_{3,2} & n_{3,3} & n_{3,4}\\n_{4,1} & n_{4,2} & n_{4,3} & n_{4,4}\end{bmatrix}.$$

further comprising:

setting a received signal $$r = \begin{bmatrix}r_{1,1} & r_{1,2} & r_{1,3} & r_{1,4}\\r_{2,1} & r_{2,2} & r_{2,3} & r_{2,4}\\r_{3,1} & r_{3,2} & r_{3,3} & r_{3,4}\\r_{4,1} & r_{4,2} & r_{4,3} & r_{4,4}\end{bmatrix},$$

and the first symbol $S_1$ is $$[r_{1,1}\ r^*_{1,2}\ r_{1,3}\ r^*_{1,4}]\begin{bmatrix}h^*_{1,1}\\h_{1,2}\\h^*_{1,1}\\h_{1,2}\end{bmatrix} + [r_{2,1}\ r^*_{2,2}\ r_{2,3}\ r^*_{2,4}]\begin{bmatrix}h^*_{2,1}\\h_{2,2}\\h^*_{2,1}\\h_{2,2}\end{bmatrix} =$$

-continued $$2(|h_{1,1}|^2 + |h_{1,2}|^2 + |h_{2,1}|^2 + |h_{2,2}|^2)S_1^* + n_1'$$

the second symbol $S_2$ is $$[r_{1,1}\ r_{1,2}^*\ r_{1,3}\ r_{1,4}^*]\begin{bmatrix} h_{1,2}^* \\ -h_{1,1} \\ h_{1,2}^* \\ -h_{1,1} \end{bmatrix} + [r_{2,1}\ r_{2,2}^*\ r_{2,3}\ r_{2,4}^*]\begin{bmatrix} h_{2,2}^* \\ -h_{2,1} \\ h_{2,2}^* \\ -h_{2,1} \end{bmatrix} =$$

$$2(|h_{1,1}|^2 + |h_{1,2}|^2 + |h_{2,1}|^2 + |h_{2,2}|^2)S_2 + n_2'$$

the third symbol $S_3$ is $$[r_{3,1}\ r_{3,2}^*\ r_{3,3}\ r_{3,4}^*]\begin{bmatrix} h_{3,3}^* \\ h_{3,4} \\ -h_{3,3}^* \\ -h_{3,4} \end{bmatrix} + [r_{4,1}\ r_{4,2}^*\ r_{4,3}\ r_{4,4}^*]\begin{bmatrix} h_{4,3}^* \\ h_{4,4} \\ -h_{4,3}^* \\ -h_{4,4} \end{bmatrix} =$$

$$2(|h_{3,3}|^2 + |h_{3,4}|^2 + |h_{4,3}|^2 + |h_{4,4}|^2)S_3 + n_3'.$$

2. The method of claim 1, wherein the columns are transmitted as a stream of symbols before any feedback from a receiver is expected.

3. The method of claim 1, further comprising:
detecting and decoding after all columns of symbols have been received at a receiver.

4. The method of claim 1, wherein the sequence of symbols is $S=[S_1\ S_2\ S_3\ S_5\ S_6\ S_7 S_8]$, and the transmit matrix is $$S = \begin{bmatrix} S_1 & -S_2^* & S_5 & -S_6^* & S_1 & -S_2^* & S_5 & -S_6^* \\ S_2 & S_1^* & S_7 & -S_8^* & S_2 & S_1^* & -S_7 & S_8^* \\ S_3 & -S_4^* & S_6 & S_5^* & -S_3 & S_4^* & S_6 & S_5^* \\ S_4 & S_3^* & S_8 & S_7^* & -S_4 & -S_3^* & -S_8 & -S_7^* \end{bmatrix},$$

and the received signal is $$r = HS + n$$

$$= \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix}$$

$$\begin{bmatrix} S_1 & -S_2^* & S_5 & -S_6^* & S_1 & -S_2^* & S_5 & -S_6^* \\ S_2 & S_1^* & S_7 & -S_8^* & S_2 & S_1^* & -S_7 & S_8^* \\ S_3 & -S_4^* & S_6 & S_5^* & -S_3 & S_4^* & S_6 & S_5^* \\ S_4 & S_3^* & S_8 & S_7^* & -S_4 & -S_3^* & -S_8 & -S_7^* \end{bmatrix} + n'$$

where noise is $$n = \begin{bmatrix} n_{1,1} & n_{1,2} & n_{1,3} & n_{1,4} & n_{1,5} & n_{1,6} & n_{1,7} & n_{1,8} \\ n_{2,1} & n_{2,2} & n_{2,3} & n_{2,4} & n_{2,5} & n_{2,6} & n_{2,7} & n_{2,8} \\ n_{3,1} & n_{3,2} & n_{3,3} & n_{3,4} & n_{3,5} & n_{3,6} & n_{3,7} & n_{3,8} \\ n_{4,1} & n_{4,2} & n_{4,3} & n_{4,4} & n_{4,5} & n_{4,6} & n_{4,7} & n_{4,8} \end{bmatrix}.$$

5. The method of claim 1, wherein each successive column is transmited at each transmission interval.

6. The method of claim 1, wherein each successive column is transmitted on adjacent sub-carriers using space-frequency block coding.

* * * * *